United States Patent
Hild (10) Patent No.: US 11,630,971 B2
(45) Date of Patent: Apr. 18, 2023

(54) PREDICTING SOFTWARE PERFORMACE BASED ON DIFFERENT SYSTEM CONFIGURATIONS

(71) Applicant: Red Hat, Inc., Raleigh, NC (US)

(72) Inventor: Marcel Hild, Kiel (DE)

(73) Assignee: RED HAT, INC., Raleigh, NC (US)

( * ) Notice: Subject to any disclaimer, the term of this patent is extended or adjusted under 35 U.S.C. 154(b) by 915 days.

(21) Appl. No.: 16/441,319

(22) Filed: Jun. 14, 2019

(65) Prior Publication Data
US 2020/0394462 A1 Dec. 17, 2020

(51) Int. Cl.
*G06F 11/00* (2006.01)
*G06K 9/62* (2022.01)
(Continued)

(52) U.S. Cl.
CPC ........ *G06K 9/6257* (2013.01); *G06F 11/0772* (2013.01); *G06F 11/0793* (2013.01);
(Continued)

(58) Field of Classification Search
CPC ............. G06F 11/3075; G06F 11/3447; G06F 11/3476; G06F 30/27
See application file for complete search history.

(56) References Cited

U.S. PATENT DOCUMENTS

| | | | |
|---|---|---|---|
| 9,612,751 | B2 | 4/2017 | Basak et al. |
| 9,971,669 | B2 | 5/2018 | Chahal et al. |

(Continued)

FOREIGN PATENT DOCUMENTS

| | | | | |
|---|---|---|---|---|
| AU | 2004284807 A1 | * | 6/2006 | ............. G06Q 10/04 |
| AU | 2010210726 A1 | * | 8/2011 | ............. G06Q 30/02 |

OTHER PUBLICATIONS

Ajila, S.A., et al., "Using Machine Learning Algorithms for Cloud Client Prediction Models in a Web VM Resource Provisioning Environment," Transactions on Machine Learning and Artificial Intelligence, Department of Systems and Computer Engineering, Carleton University, Feb. 27, 2016, https://www.academia.edu/33482038/Using_Machine_Learning_Algorthms_for_Cloud_Client_Prediction_Models_in_a_Web_VM_Resource_Provisioning_Environment.

(Continued)

*Primary Examiner* — Elmira Mehrmanesh
(74) *Attorney, Agent, or Firm* — Kilptrick Townsend & Stockton LLP (57) ABSTRACT

Software performance can be predicted based on different system configurations. In one example, a computing device can receive historical datasets associated with copies of a software application executed by a group of computing environments during a prior timespan. Each historical dataset can indicate respective changes during the prior timespan to at least one performance characteristic of one of the copies of the software application executed by one of the computing environments in the group. Each computing environment in the group can being configured differently than the other computing environments in the group. The computing device can also convert the historical datasets into training data for a machine-learning model, and train the machine-learning model. This can yield a trained machine-learning model configured to generate a forecast of the performance characteristic for the software application over a future timespan.

20 Claims, 5 Drawing Sheets

(51) Int. Cl.
*G06N 20/00* (2019.01)
*G06F 11/34* (2006.01)
*H04L 67/00* (2022.01)
*G06F 11/07* (2006.01)
*G06F 11/30* (2006.01)

(52) U.S. Cl.
CPC ........ *G06F 11/302* (2013.01); *G06F 11/3075* (2013.01); *G06F 11/3447* (2013.01); *G06F 11/3476* (2013.01); *G06N 20/00* (2019.01); *H04L 67/34* (2013.01)

(56) References Cited

U.S. PATENT DOCUMENTS

| | | | |
|---|---|---|---|
| 10,140,164 | B2 | 11/2018 | Mehta et al. |
| 10,554,738 | B1* | 2/2020 | Ren .................... G06F 11/3414 |
| 2006/0277206 | A1* | 12/2006 | Bailey ................. G06F 11/3409 |
| | | | 707/999.102 |
| 2017/0147407 | A1 | 5/2017 | Nassser |
| 2018/0239658 | A1* | 8/2018 | Whitner .............. G06F 11/3409 |
| 2018/0246558 | A1 | 8/2018 | Morad |
| 2019/0079846 | A1 | 3/2019 | Shaik et al. |
| 2020/0183753 | A1* | 6/2020 | Kumar ................. H04L 43/0817 |
| 2020/0311600 | A1* | 10/2020 | Kulkarni ................ G06N 20/00 |

OTHER PUBLICATIONS

Chen, P.M., et al., "Storage Performance-Metrics and Benchmarks," Computer Science Division, Dept. of EECS University of California, Berkeley, 1993, https://pdfs.semanticscholar.org/a9e7/aa4f77874bf9a3e49b19a8d6d11e54e8243c.pdf.

Chang, E., "Introducing metric forecasts for predictive monitoring in Datadog," Datadog, Dec. 12, 2017, https://www.datadoghq.com/blog/forecasts-datadog/.

* cited by examiner

PREDICTING SOFTWARE PERFORMACE BASED ON DIFFERENT SYSTEM CONFIGURATIONS

TECHNICAL FIELD

The present disclosure relates generally to predicting software performance and improving software execution. More specifically, but not by way of limitation, this disclosure relates to predicting software performance based on different system configurations.

BACKGROUND

System administrators often rely on monitoring software to monitor current system resources for anomalies in real time. For example, system administrators may execute monitoring software capable of determining whether current processor or memory usage has surpassed a particular threshold and providing corresponding alerts so that the system administrator can take corrective action.

DETAILED DESCRIPTION

Although system administrators may rely on monitoring software to perform real-time monitoring of current system resources in their computing environments, this type of monitoring software typically fails to provide any insight into how various software applications executing in their computing environments will perform in the future, which can be important for preventing failures and properly allocating system resources.

Some examples of the present disclosure overcome one or more of the abovementioned problems by training a machine-learning model (e.g., a neural network) based on historical data indicating how a software application performed in a variety of different computing environments over the course of a prior timespan. The historical data can be obtained from numerous computing environments with different system configurations, resulting in a larger amount of training data that more holistically represents the software application's performance than may otherwise be possible. The net result is a trained machine-learning model with a more holistic understanding of how the software application performs under a variety of system configurations. Users can then execute the trained machine-learning model in their respective computing environments to generate forecasts indicating how the software application will perform during a future timespan within the context of their computing environments. This can enable the users to preemptively identify any potential problems related to the software application and implement preventative or corrective measures to prevent the anomalies from occurring.

One particular example includes a group of computing environments with different system configurations. Each of the computing environments can execute a respective copy of database server software over the same timespan. As the computing environments each execute their respective copy of the database server software, they can each store respective performance data about their copy of the database server software at various points during the timespan (e.g., periodically at a certain time interval). The performance data indicates one or more performance characteristics of (e.g., performance metrics for) the database server software. Examples of the performance characteristics can include disk usage characteristics, memory usage characteristics, processor usage characteristics, input/output (I/O) characteristics, throughput characteristics, bandwidth consumption characteristics, latency characteristics, or any combination of these. Each of the computing environments can then generate a respective historical dataset for its copy of the database server software based on the respective performance data. The historical dataset is a time series detailing changes to one or more of the performance characteristic(s) over the timespan. The historical dataset may also include configuration data detailing at least some aspects of the computing environment's system configuration. After generating the historical datasets, the computing environments can transmit their respective historical datasets to a centralized server.

The centralized server can receive the historical datasets and convert them into training data for a machine-learning model, such as a neural network, a support vector machine, a Bayesian classifier, or any combination of these. In some examples, converting the historical datasets into the training data may involve normalizing the historical datasets, removing data from the historical datasets, adding data to the historical datasets, or any combination of these. For example, this conversion may involve anonymizing the historical datasets to protect the identities of the computing environments or users thereof. As used herein, "anonymizing" can adding noise (e.g., random or excess data) into the historical datasets or removing metadata that is potentially identifying from the historical data.

After generating the training data, the centralized server can train the machine-learning model based on the training data. For example, the centralized server can train the machine-learning model by iteratively tuning weights internal to the machine-learning model based on the training data. This can produce a trained machine-learning model that has a more complete and holistic understanding of the performance characteristics of the database server software than would otherwise be possible.

In some examples, the centralized server can transmit the trained machine-learning model to one or more of the computing environments or third parties, which can then execute the trained machine-learning model to generate a forecast indicating the performance of the database server software during a future timespan. For example, a third party can execute the trained machine-learning model based on its specific system configuration to generate a forecast predicting the performance of the database server software within the context of that specific system configuration during the future timespan. Forecasts generated in this way may be more accurate than would otherwise be possible using conventional approaches, since they rely on a more robust and complete set of training data. The forecasts may indicate upper limits, lower limits, seasonal trends, and other information related to the performance characteristics of the database server software during the future timespan, which can be used to avoid potential problems with the database server software. For example, this information can be analyzed by anomaly detection software to detect anomalies (e.g., unexpected peaks, troughs, or patterns) indicating potential problems related to the database server software in the future, which in turn can trigger corresponding alerts for a user to take corrective or preventative action.

In some examples, the trained machine-learning model may also be used to determine how to improve (e.g., optimize) performance of the database server software during the future timespan. For example, a third party can obtain the trained machine-learning model and execute the trained machine-learning model based on its computing environment's system configuration. This may involve the third party providing system information as input to the trained machine-learning model, where the system information describes at least one software or hardware setting defining the third party's system configuration. The trained machine-learning model can responsively produce an initial forecast predicting the performance of the database server software within the context of that system configuration during a future timespan. Performance improvement software can then be executed to iteratively adjust variable values in the system information to generate a group of adjusted inputs, which in turn can be fed into the trained machine-learning model to produce a group of adjusted forecasts corresponding to the adjusted inputs. The performance improvement software can compare each adjusted forecast in the group to the initial forecast to determine which of the forecasts is the "best" according to one or more predefined criteria. If one of the adjusted forecasts in the group is "better" than the initial forecast, the performance improvement software can provide details to the user about the variable values that it adjusted (in the system information) to obtain the improved prediction, so that the user can implement those changes as desired.

These illustrative examples are given to introduce the reader to the general subject matter discussed here and are not intended to limit the scope of the disclosed concepts. While the above examples are provided with respect to database server software for illustrative purposes, other examples can involve other types of software applications. The following sections describe various additional features and examples with reference to the drawings in which like numerals indicate like elements but, like the illustrative examples, should not be used to limit the present disclosure.

Figure 1:
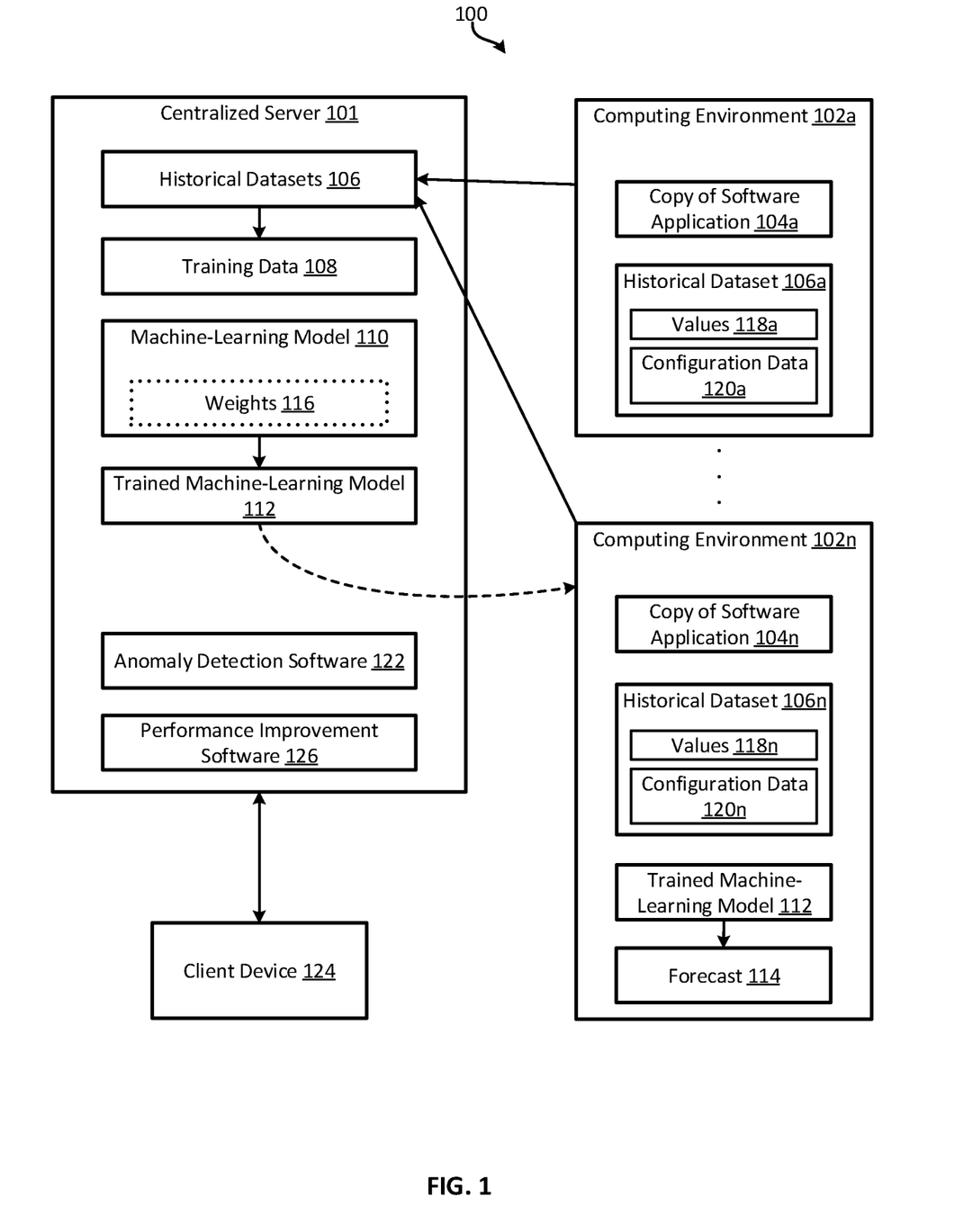
FIG. 1 depicts a block diagram of an example of a system for predicting software performance based on different system configurations according to some aspects.

FIG. 1 depicts a block diagram of an example of a system 100 for predicting software performance based on different system configurations according to some aspects. The system includes a centralized server 101 communicatively coupled to any number and combination of computing environments 102a-n. The centralized server 101 can receive historical datasets 106a-n indicating performance characteristics related to copies of a software application 104a-n executed by the computing environments 102a-n. The centralized server 101 can receive the historical datasets 106a-n from the computing environments 102a-n or one or more databases. The centralized server 101 can then aggregate the historical datasets 106a-n (e.g., into a single historical dataset 106), convert the historical dataset 106 into training data 108, and train a machine-learning model 110 based on the training data 108 to produce a trained machine-learning model 112 associated with the software application. This trained machine-learning model 112 may then be transmitted to a third party or a computing environment 102n (e.g., as depicted in FIG. 1), where it can be executed to generate a forecast 114 predicting performance the software application during a future timespan.

Figure 2:
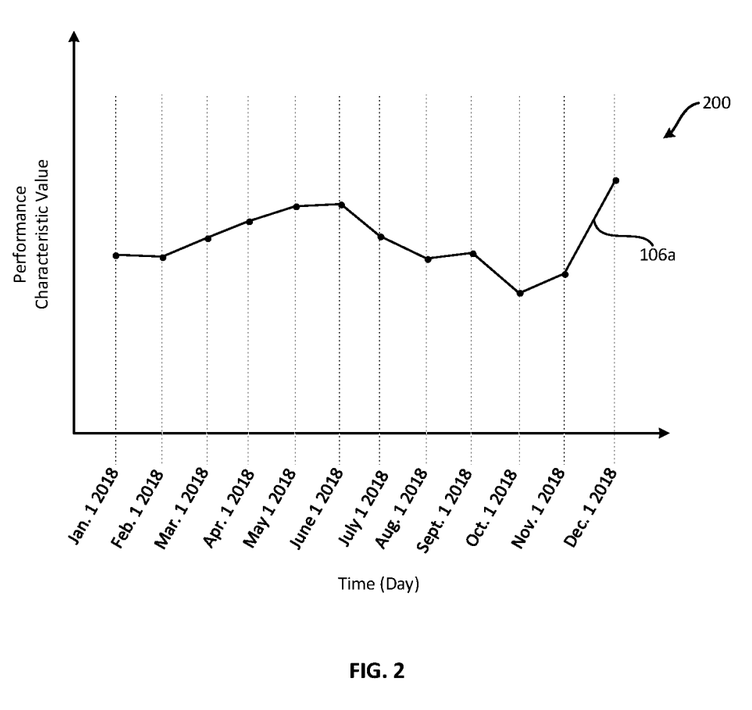
FIG. 2 depicts an example of a historical dataset according to some aspects.

More specifically, the computing environments 102a-n can each include a respective copy of a software application 104a-n. The software application can be a service, microservice, utility application, or any other software. Each of the computing environments 102a-n can execute its respective copy of the software application 104a-n over a timespan and log values 118a for one or more performance characteristics associated with the software application at various points during the timespan. For example, computing environment 102a can execute its copy of the software application 104a and log values 118a related to various performance characteristics (e.g., disk usage, memory usage, or processor usage) periodically, such as every minute, hour, or day. The logged values 118a can form part of a historical dataset 106a, which is a time series indicating these logged values 118a over time. One example of a historical dataset 106a is shown in the graph 200 of FIG. 2. As shown, the historical dataset 106a includes values of a performance characteristic (e.g., CPU or memory usage) associated with a software application, where the values fluctuate over a one year timespan ranging from Jan. 1, 2018 to Dec. 1, 2018.

Referring back to FIG. 1, each of the computing environments 102a-n has a unique system configuration. For example, computing environment 102a may have one system configuration that involves a certain piece of software that is absent from another system configuration of computing environment 102n. As another example, the computing environment 102a may have one system configuration in which a certain piece of software has one or more different settings than that same piece of software in another system configuration of computing environment 102n. As still another example, computing environment 102a may have one system configuration that involves a certain piece of hardware that is absent from another system configuration of computing environment 102n. As yet another example, the computing environment 102a may have one system configuration in which a certain piece of hardware has one or more different settings than that same piece of hardware in another system configuration of computing environment 102n. These differences between system configurations can influence how the copies of the software application 104a-n perform in the various computing environments 102a-n.

In some examples, each of the computing environments 102a-n can determine respective configuration data 120a-n describing at least some aspects of its system configuration. For example, the configuration data 120a-n can be input by a user or obtained from one or more configuration files. The configuration data 120a can indicate software or hardware installed in the computing environment 102a, settings of the software or hardware installed in the computing environment 102a, a software or hardware topology of the computing environment 102a, or any combination of these. The computing environments 102a-n can then incorporate that configuration data 120a-n into the its historical data 108a-n. This can help teach the machine-learning model 110 how various system configurations affect performance during a subsequent training process.

The computing environments 102a-n can transmit their respective historical datasets 106a-n to the centralized server 101. This may involve transmitting the respective historical datasets 106a-n to the centralized server 101 via a network, such as a local area network (LAN), a wireless area network (WAN), or the Internet. In some examples, this may involve storing the historical datasets 106a-n in one or more databases from which the centralized server 101 can retrieve the historical datasets 106a-n.

The centralized server 101 can receive the historical datasets 106a-n and convert them into training data 108. Converting the historical datasets 106a-n into the training data 108 can involve aggregating them together, normalizing them, removing data from them, adding data to them, or otherwise processing the historical datasets 106a-n such that they are suitable for use during a subsequent training process. For example, the centralized server 101 may anonymize the historical datasets 106a-n. Alternatively, the computing environments 102a-n may anonymize the historical datasets 106a-n prior to transmitting them to the centralized server 101. The training data 108 can include relationships between time, the configuration data 120a-n for the computing environments 102a-n, and/or the values 118a-n of the performance characteristics.

After generating the training data 108, the centralized server 101 can train a machine-learning model 110 based on the training data 108. Examples of the machine-learning model 110 can include a neural network, such as a long short-term memory (LSTM) neural network or a convolutional neural network (CNN); a support vector machine; a Bayesian classifier, such as a Naïve Bayes classifier; or any combination of these. The centralized server 101 can train the machine-learning model 110 by iteratively tuning weights 116 (e.g., node weights or connection weights) internal to the machine-learning model 110 based on the training data 108 to produce a trained machine-learning model 112.

In some examples, the centralized server 101 can execute the trained machine-learning model 112 to generate a forecast predicting future values for one or more performance characteristics of the software application during a future timespan. For example, the centralized server 101 can be part of a cloud environment (e.g., a software as a service (SaaS) environment) to which a client device 124 can connect, input its system configuration, and execute the trained machine-learning model 112 to obtain a forecast related to its system configuration. Additionally or alternatively, the centralized server 101 can transmit the trained machine-learning model 112 back to the computing environments 102a-n, which in turn can execute the trained machine-learning model 112 to generate respective forecasts. For example, FIG. 1 depicts an example in which the centralized server 101 transmits the trained machine-learning model 112 to the computing environments 102n (as shown by the dashed arrow), which in turn can execute the trained machine-learning model 112 to generate forecast 114. Additionally or alternatively, the centralized server 101 can transmit the trained machine-learning model 112 to a third party (an entity that did not provide one of the historical datasets 106a-n used to train the machine-learning model 110), such as a customer. The third party can then execute the trained machine-learning model 112 to generate a forecast.

Figure 3:
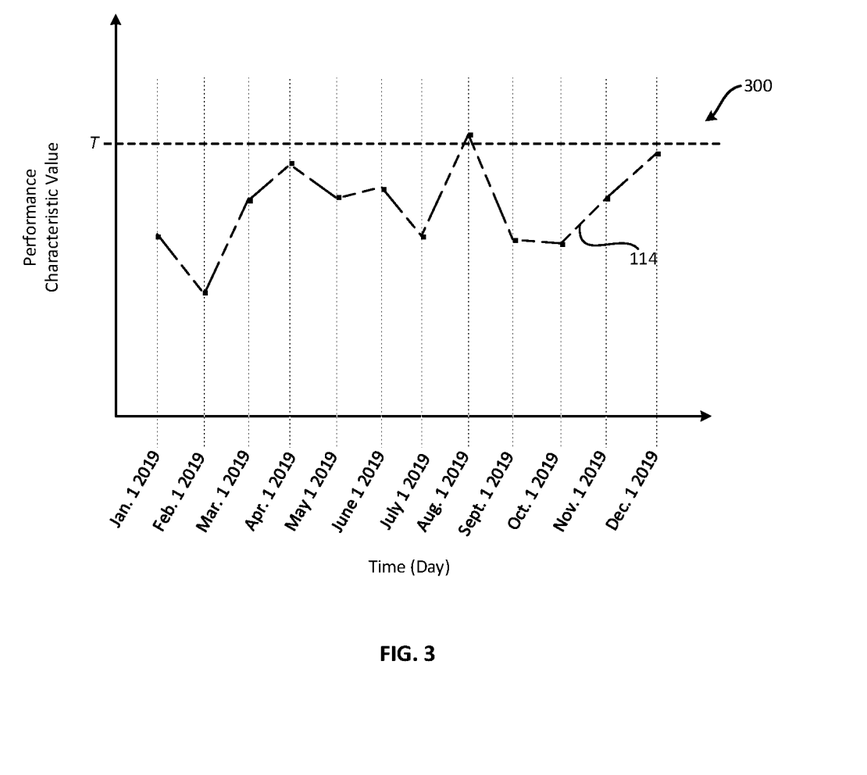
FIG. 3 depicts an example of a forecast according to some aspects.

One example of the forecast 114 is shown in the graph 300 of FIG. 3. As shown, the forecast 114 includes values of a performance characteristic (e.g., cache consumption or latency) associated with a software application, where the values fluctuate over a one year timespan ranging from Jan. 1, 2019 to Dec. 1, 2019. This one year timespan is considered a "future timespan" with respect to the "prior timespan" of the historical data 106a shown in FIG. 2 (e.g., Jan. 1, 2018 to Dec. 1, 2018).

Returning to FIG. 1, in some examples, the forecast 114 can be automatically analyzed for anomalies with anomaly detection software 122. The anomaly detection software 122 can analyze the forecast 114 for one or more anomalies indicating potential problems related to the software application. Any of the centralized server 101, computing environments 102a-n, or third parties, can execute the anomaly detection software 122. For example, the computing environment 102n may generate the forecast 114 and then transmit it to the centralized server 101, which can receive the forecast 114 and analyze it for anomalies using the anomaly detection software 122. The centralized server 101 can then transmit any applicable alerts back to the computing environment 102n, so that a user can take appropriate action. While the anomaly detection software 122 is depicted in FIG. 1 as being separate from the trained machine-learning model 112, in other examples anomaly detection software 122 may form part of the trained machine-learning model 112, such that the anomaly detection process can occur after (or concurrently with) the forecast generation process.

In some examples, the anomaly detection software 122 may include a range of expected values for a performance characteristic associated with the software application. The range of expected values may be derived from the historical data 106. The anomaly detection software 122 can analyze the forecast 114 based on this range of expected values and flag values that fall outside the range as anomalous. For example, the anomaly detection software 122 can analyze the forecast 114 to determine whether any of its values exceeds an upper limit T (e.g., as shown by the dashed line in FIG. 3). If so, the anomaly detection software 122 can flag that value as anomalous. Additionally or alternatively, the anomaly detection software 122 can analyze the forecast 114 for unexpected patterns of values that substantially deviate (e.g., deviate by at least a threshold amount) from the historical data 106a-n and flag such patterns as anomalous. The anomaly detection software 122 can then provide one or more alerts to a user based on the flagged values to indicate the potential anomalies. In some examples, the anomaly detection software 122 can provide the alerts to the user by transmitting the alerts to a client device 124 associated with the user, such as the user's mobile phone, laptop computer, or desktop computer.

In some examples, performance improvement software 126 can be executed to determine how to improve performance of the software application during the future timespan. For example, system information about the computing environment 102n may be provided as input to the trained machine-learning model 112 to generate an initial forecast, such as forecast 114. The system information may include, for example, a processor characteristic, such as a type, manufacturer, or speed of a processor in the computing environment 102n; a memory characteristic, such as a type, manufacturer, or speed of memory in the computing environment 102n; a latency characteristic associated with the computing environment 102n; a throughput characteristic associated with the computing environment 102n; or any combination of these. The performance improvement software 126 may also receive the system information and iteratively adjust variable values in the system information to produce a group of adjusted inputs. As used herein, a "variable" is a configurable parameter defining at least part of the system information and a "variable value" is a value (e.g., numeric value) of the variable. The performance improvement software 126 can then feed the group of adjusted inputs into the trained machine-learning model 112 to produce a group of adjusted forecasts. The performance improvement software 126 can then compare each adjusted forecast in the group to the initial forecast to determine which of the forecasts is the "best" according to one or more predefined criteria, which may be set by a user or predefined. If one of the adjusted forecasts in the group is "better" than the initial forecast, the performance improvement software 126 can output details to the user about the variable values that it adjusted (in the system information) to obtain the improved prediction, so that the user can implement those changes or the system 100 can automatically implement those changes.

Any of the centralized server 101, computing environments 102a-n, or third parties, can execute the performance improvement software 126. For example, the computing environment 102n may generate the forecast 114 and then transmit it to the centralized server 101, which can receive the forecast 114 and execute the performance improvement software 126 in relation to the forecast 114. The centralized server 101 can then transmit any applicable recommendations for improving performance of the software application back to the computing environment 102n, so that any desirable changes to the system configuration of the computing environment 102n can be implemented.

While the exemplary system 100 of FIG. 1 shows an illustrative configuration of components (e.g., the centralized server 101, computing environments 102a-n, historical datasets 106a-n, copies of the software application 104a-n, machine-learning model 110, trained machine-learning model 112, forecast 114, anomaly detection software 122, performance improvement software 126, etc.), other examples may involve other more, fewer, or a different arrangement of these components. For instance, the centralized server 101 can serve as one of the computing environments 102a-n, such that the centralized server 101 also generates one of the historical datasets 106a-n used to train the machine-learning model 110.

Figure 4:
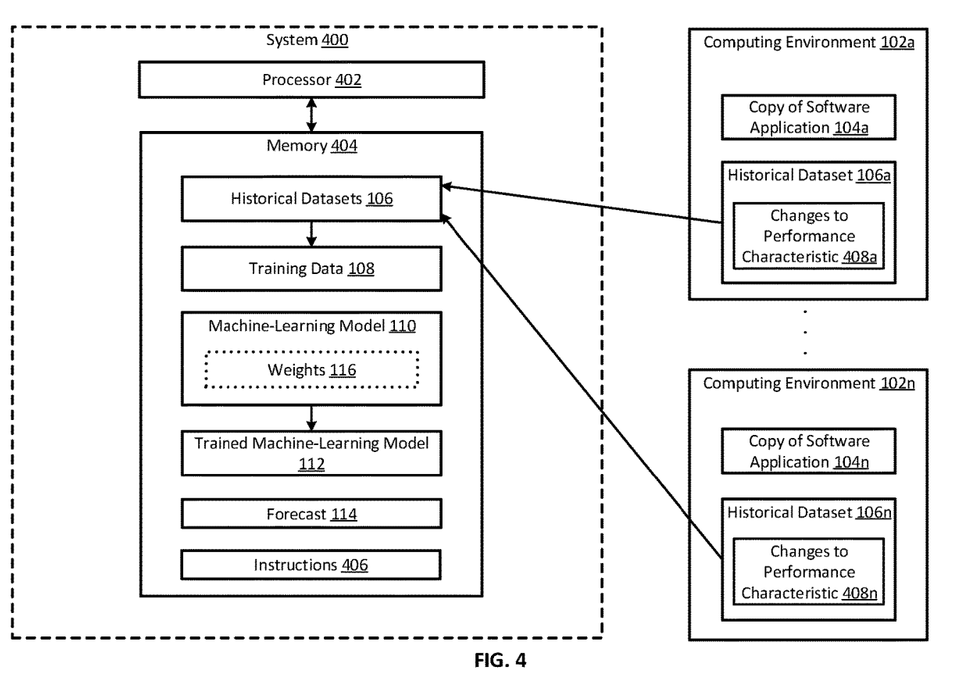
FIG. 4 depicts a block diagram of another example of a system for predicting software performance based on different system configurations according to some aspects.

FIG. 4 depicts a block diagram of another example of a system 400 for predicting software performance based on different system configurations according to some aspects. The components shown in FIG. 4 are exemplary, and other examples can include more components, fewer components, different components, or a different configuration of the components shown in FIG. 4.

The system 400 includes a processor 402 communicatively coupled with a memory 404. The processor 402 and the memory 404 can be part of a single computing device or distributed from one another. The processor 402 can include one processing device or multiple processing devices. Non-limiting examples of the processor 402 include a Field-Programmable Gate Array (FPGA), an application-specific integrated circuit (ASIC), a microprocessor, etc. The processor 402 can execute instructions 406 stored in the memory 404 to perform operations. In some examples, the instructions 406 can include processor-specific instructions generated by a compiler or an interpreter from code written in any suitable computer-programming language, such as C, C++, C#, etc.

The memory 404 can include one memory device or multiple memory devices. The memory 404 can be non-volatile and may include any type of memory device that retains stored information when powered off. Non-limiting examples of the memory 404 include electrically erasable and programmable read-only memory (EEPROM), flash memory, or any other type of non-volatile memory. In some examples, at least some of the memory can include a medium from which the processor 402 can read instructions 406. A computer-readable medium can include electronic, optical, magnetic, or other storage devices capable of providing the processor 402 with computer-readable instructions 406 or other program code. Non-limiting examples of a computer-readable medium include magnetic disk(s), memory chip(s), ROM, random-access memory (RAM), an ASIC, a configured processor, optical storage, or any other medium from which a computer processing device can read the instructions 406.

In some examples, the processor 402 may be communicatively coupled to one or more computing environments 102a-n (which can be collectively referred to as a "plurality of computing environments 102"). The processor 402 can receive historical datasets 106a-n associated with copies of a software application 104a-n executed by the plurality of computing environments 102 during a prior timespan. Each historical dataset 106a-n can indicate respective changes 408a-n during the prior timespan to a performance characteristic of one of the copies of the software application 104a-n executed by a respective computing environment 102a-n among the plurality of computing environments 102. Each computing environment 102a-n among the plurality of computing environments 102 can be configured differently than the other computing environments among the plurality of computing environments 102.

Next, the processor 402 can convert the historical datasets 106 into training data 108 for a machine-learning model 110. The processor 402 can train the machine-learning model 110 by iteratively tuning weights 116 internal to the machine-learning model 110 based on the training data 108, thereby producing a trained machine-learning model 112. The trained machine-learning model 112 can be configured to generate a forecast 114 of the performance characteristic for the software application over a future timespan. For example, a user can provide system information as input into the trained machine-learning model 112 and receive a forecast 114 as output from the machine-learning model 112, where the forecast 114 is a prediction as to how the software application will likely perform during a future timespan in the context of the user's system.

Figure 5:
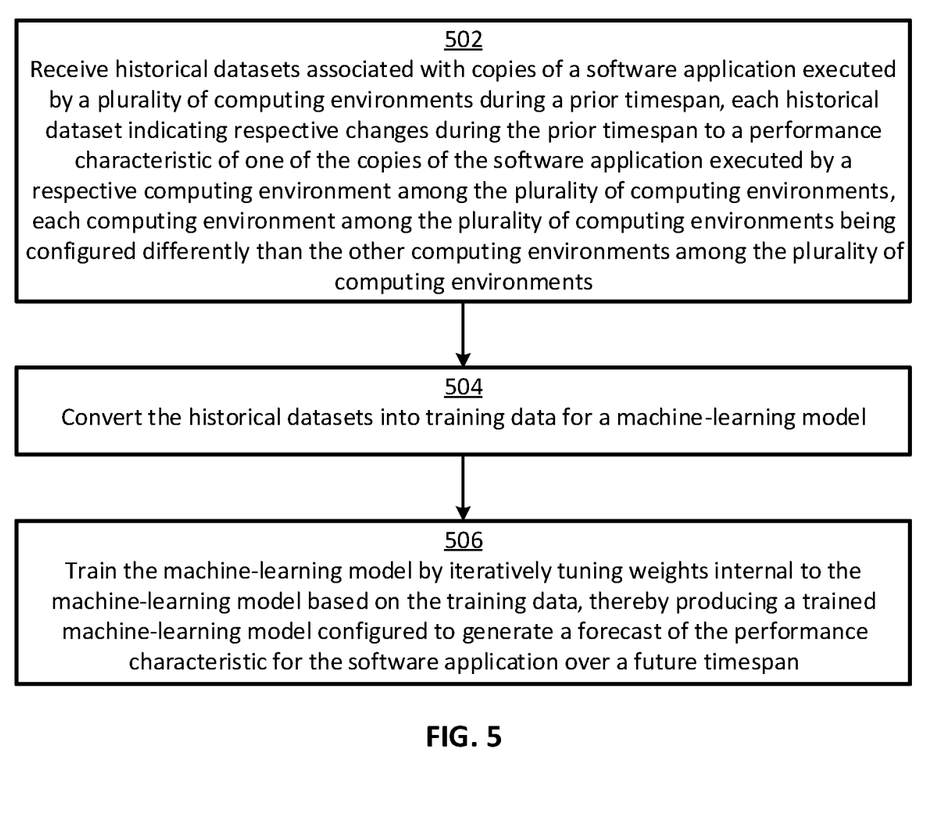
FIG. 5 depicts a flow chart of an example of a process for predicting software performance based on different system configurations according to some aspects.

FIG. 5 depicts a flow chart of an example of a process for predicting software performance based on different system configurations according to some aspects. Other examples can include more steps, fewer steps, different steps, or a different order of the steps than is shown in FIG. 5. The steps of FIG. 5 are discussed below with reference to the components discussed above in relation to FIG. 4.

In block 502, a processor 402 receives historical datasets 106a-n associated with copies of a software application 104a-n executed by the plurality of computing environments 102 during a prior timespan. Each historical dataset 106a-n can indicate respective changes 408a-n during the prior timespan to a performance characteristic of one of the copies of the software application 104a-n executed by a respective computing environment 102a-n among the plurality of computing environments 102. Each computing environment 102a-n among the plurality of computing environments 102 can be configured differently than the other computing environments among the plurality of computing environments 102.

In block 504, the processor 402 converts the historical datasets 106 into training data 108 for a machine-learning model 110. This may involve anonymizing the historical datasets 106 by injecting noise into the historical datasets 106 to obfuscate any potentially identifying information therein.

In block 506, the processor 402 trains the machine-learning model 110 by iteratively tuning weights 116 internal to the machine-learning model 110 based on the training data 108, thereby producing a trained machine-learning model 112. The trained machine-learning model 112 can be configured to generate a forecast 114 of the performance characteristic for the software application over a future timespan.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processor; and
a memory including instructions that are executable by the processor for causing the processor to:
receive historical datasets associated with copies of a software application executed by a plurality of computing environments during a prior timespan, each historical dataset indicating respective changes during the prior timespan to a performance characteristic of one of the copies of the software application executed by a respective computing environment among the plurality of computing environments, each computing environment among the plurality of computing environments being configured differently than the other computing environments among the plurality of computing environments;
anonymize the historical datasets;
convert the historical datasets into training data for a machine-learning model;
train the machine-learning model by iteratively tuning weights internal to the machine-learning model based on the training data, thereby producing a trained machine-learning model configured to generate a forecast of the performance characteristic for the software application over a future time window, the forecast including a plurality of predicted future values for the performance characteristic during the future time window; and
transmit the trained machine-learning model over a network to a third party to enable the third party to execute the trained machine-learning model and thereby generate the forecast.

2. The system of claim 1, wherein the memory further comprises instructions that are executable by the processor for causing the processor to:
execute the trained machine-learning model to generate the forecast;
detect an anomaly associated with the software application in the forecast; and
in response to detecting the anomaly in the forecast, generate an alert indicative of the anomaly.

3. The system of claim 1, wherein the performance characteristic includes a disk usage characteristic, a memory usage characteristic, a processor usage characteristic, or an input/output (I/O) usage characteristic.

4. The system of claim 1, wherein the historical datasets are received from the plurality of computing environments.

5. The system of claim 1, wherein the historical datasets include configuration data describing system configurations of the plurality of computing environments during the prior timespan, each historical dataset having respective configuration data describing a respective system configuration of a respective computing environment among the plurality of computing environments from which the historical dataset was obtained.

6. The system of claim 5, wherein the memory further comprises instructions that are executable by the processor for causing the processor to generate the training data based on the historical datasets by including at least some of the configuration data describing the system configurations of the plurality of computing environments into the training data.

7. The system of claim 1, wherein the memory further comprises instructions that are executable by the processor for causing the processor to anonymize the historical datasets by injecting noise into the historical datasets.

8. A method comprising:
receiving, by a processor of a system, historical datasets associated with copies of a software application executed by a plurality of computing environments during a prior timespan, each historical dataset indicating respective changes during the prior timespan to a performance characteristic of one of the copies of the software application executed by a respective computing environment among the plurality of computing environments, each computing environment among the plurality of computing environments being configured differently than the other computing environments among the plurality of computing environments;
anonymizing, by the processor, the historical datasets;
converting, by the processor, the historical datasets into training data for a machine-learning model;
training, by the processor, the machine-learning model by iteratively tuning weights internal to the machine-learning model based on the training data, thereby producing a trained machine-learning model configured to generate a forecast of the performance characteristic for the software application over a future time window, the forecast including a plurality of predicted future values for the performance characteristic during the future time window; and
transmitting, by the processor, the trained machine-learning model over a network to a third party to enable the third party to execute the trained machine-learning model and thereby generate the forecast.

9. The method of claim 8, further comprising:
executing the trained machine-learning model to generate the forecast;
detecting an anomaly associated with the software application in the forecast; and
in response to detecting the anomaly in the forecast, generating an alert indicative of the anomaly.

10. The method of claim 8, wherein the performance characteristic includes a disk usage characteristic, a memory usage characteristic, a processor usage characteristic, or an input/output (I/O) usage characteristic.

11. The method of claim 8, wherein the historical datasets are received from the plurality of computing environments.

12. The method of claim 8, wherein the historical datasets include configuration data describing system configurations of the plurality of computing environments during the prior timespan, each historical dataset having respective configuration data describing a respective system configuration of a respective computing environment among the plurality of computing environments from which the historical dataset was obtained.

13. The method of claim 12, further comprising generating the training data based on the historical datasets by including at least some of the configuration data describing the system configurations of the plurality of computing environments into the training data.

14. The method of claim 8, further comprising anonymizing the historical datasets by injecting noise into the historical datasets.

15. A non-transitory computer-readable medium comprising program code that is executable by a processor of a system for causing the processor to:

receive historical datasets associated with copies of a software application executed by a plurality of computing environments during a prior timespan, each historical dataset indicating respective changes during the prior timespan to a performance characteristic of one of the copies of the software application executed by a respective computing environment among the plurality of computing environments, each computing environment among the plurality of computing environments being configured differently than the other computing environments among the plurality of computing environments;

anonymize the historical datasets;

convert the historical datasets into training data for a machine-learning model;

train the machine-learning model by iteratively tuning weights internal to the machine-learning model based on the training data, thereby producing a trained machine-learning model configured to generate a forecast of the performance characteristic for the software application over a future time window, the forecast including a plurality of predicted future values for the performance characteristic during the future time window; and transmit the trained machine-learning model over a network to a third party to enable the third party to execute the trained machine-learning model and thereby generate the forecast.

16. The non-transitory computer-readable medium of claim 15, further comprising program code that is executable by the processor for causing the processor to:

execute the trained machine-learning model to generate the forecast;

detect an anomaly associated with the software application in the forecast; and in response to detecting the anomaly in the forecast, generate an alert indicative of the anomaly.

17. The non-transitory computer-readable medium of claim 15, wherein the performance characteristic includes a disk usage characteristic, a memory usage characteristic, a processor usage characteristic, or an input/output (I/O) usage characteristic.

18. The non-transitory computer-readable medium of claim 15, wherein the historical datasets are received from the plurality of computing environments.

19. The non-transitory computer-readable medium of claim 15, wherein the historical datasets include configuration data describing system configurations of the plurality of computing environments during the prior timespan, each historical dataset having respective configuration data describing a respective system configuration of a respective computing environment among the plurality of computing environments from which the historical dataset was obtained.

20. The non-transitory computer-readable medium of claim 15, further comprising program code that is executable by the processor for causing the processor to anonymize the historical datasets by injecting noise into the historical datasets.

* * * * *